(12) United States Patent
Lambrecht et al.

(10) Patent No.: US 6,549,954 B1
(45) Date of Patent: Apr. 15, 2003

(54) OBJECT ORIENTED ON-CHIP MESSAGING

(75) Inventors: J. Andrew Lambrecht, Austin, TX (US); Alfred C. Hartmann, Round Rock, TX (US); Gary M. Godrey, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/378,877

(22) Filed: Aug. 23, 1999

Related U.S. Application Data

(63) Continuation-in-part of application No. 09/227,509, filed on Jan. 6, 1999, now Pat. No. 6,047,002, which is a continuation of application No. 08/783,433, filed on Jan. 16, 1997, now abandoned.

(51) Int. Cl.[7] .............................................. G06F 13/00
(52) U.S. Cl. ...................................... 709/315; 709/240
(58) Field of Search ................................ 709/240, 242, 709/238, 315, 316, 317, 318

(56) References Cited

U.S. PATENT DOCUMENTS

| | | | | |
|---|---|---|---|---|
| 5,218,676 A | * | 6/1993 | Ben-Ayed et al. | 709/240 |
| 5,511,188 A | * | 4/1996 | Pascucci et al. | 707/104.1 |
| 5,699,521 A | * | 12/1997 | Iizuka et al. | 370/455 |
| 5,915,112 A | * | 6/1999 | Boutcher | 709/330 |
| 5,916,306 A | * | 6/1999 | Ruiz | 709/242 |

* cited by examiner

*Primary Examiner*—Eric Coleman
(74) *Attorney, Agent, or Firm*—Meyertons Hood Kivlin Kowert & Goetzel, P.C.; Jeffrey C. Hood

(57) ABSTRACT

A system and method that operate on data in a communication system. The system comprises a communication network for routing objects that include data and a tag and comprised of processing modules for processing the data included in the objects and routing nodes that are operable to route the objects between the processing modules. Each processing module includes a processing memory for storing objects. Each routing node includes a routing memory for storing memory objects and is operable to route objects throughout the system. The objects include stored objects stored in various ones of the respective processing memories and the respective routing memories. Each stored object further includes methods that are executable to perform operations on the data and a processing list that lists the methods to be executed on the data. Each processing node interrogates objects to examine the processing list and execute methods identified by the processing list to perform corresponding operations on the data. The method routes objects in the communication system.

15 Claims, 9 Drawing Sheets

PACKET

OBJECT ORIENTED ON-CHIP MESSAGING

Continuation Data

This is a continuation-in-part of co-pending application Ser. No. 09/227,509 now U.S. Pat. No. 6,047,002, filed Jan. 6, 1999, titled "Communication Traffic Circle System and Method for Performing Packet Conversion and Routing Between Different Packet Formats Including an Instruction Field," whose inventors are Alfred C. Hartmann and Carl K. Wakeland, which is a continuation of application Ser. No. 08/783,433, filed Jan. 16, 1997, titled "Communication Traffic Circle System and Method for Performing Packet Conversion and Routing Between Different Packet Formats," whose inventor is Alfred C. Hartmann, now abandoned.

BACKGROUND OF THE INVENTION

1. Field of the Invention

The present invention relates to computer system architectures, and more particularly to an on-chip data transfer network including object tags or processing lists associated with objects for improved information routing between multiple on-chip modules.

2. Description of the Related Art

Computer systems have traditionally comprised a system unit or housing which comprises a plurality of electrical components comprising the computer system. A computer system typically includes a motherboard that is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. The integration of a plurality of modules or functions on a single computer chip requires an improved data transfer chip architecture. In addition, due to the shorter distances and tighter integration of components on a chip, new data transfer methodologies are necessary to take advantage of this environment. Therefore, an improved system and method is desired for communications on complex computer chips.

SUMMARY OF THE INVENTION

A system is disclosed that operates on data in a communication system. The system comprises a communication network for routing objects that include data and a tag. The communication network is preferably comprised of a plurality of processing modules for processing the data included in the objects and a plurality of routing nodes that are operable to route the objects between different ones of the plurality of processing modules. Each of the processing modules includes a respective processing memory for storing the objects. Each of the routing nodes includes a respective routing memory for storing memory objects, and each of the routing nodes is operable to route objects throughout the system. The objects include stored objects stored in various ones of the respective processing memories and the respective routing memories. Each of the plurality of stored objects further includes one or more methods that are executable to perform operations on the data and a processing list that lists one or more of the methods to be executed on the data. Each of the plurality of processing nodes is operable to interrogate one or more of the objects to examine the processing list and execute one or more methods identified by the processing list to perform corresponding operations on the data.

In one embodiment, each of the objects may only be modified by a method included in the methods that are executable to perform operations on the data comprised in a respective stored object. In various embodiments, the tags include one or more of the group consisting of: a creation time stamp, a last modified time stamp, a priority value, a creator ownership value, an access allowed valued, a previously modified-by value, a last modified-by value, an assembly tag, and various destination process tags.

In one embodiment, each of the routing nodes is directly connected to two or more other routing nodes, and each of the routing nodes is operable to communicate data. A plurality of buses connects between each of the routing nodes. Each of the plurality of modules is coupled to at least one of the plurality of routing nodes, and the plurality of modules are operable to communicate with each other through the routing nodes. Furthermore, the plurality of routing nodes is dynamically re-configurable to form two or more separate communication paths.

A method is also contemplated, for routing objects in a communication system. The communication system comprises a plurality of routing nodes and a plurality of interconnecting processing modules coupled to the routing nodes, with each of the objects including a tag that identifies the object and the object data. The method generally comprises communicating a communication routing data structure to one or more of the plurality of routing nodes. The communication routing data structure includes information regarding one or more objects comprised in the communication system. The communication routing data structure further includes the intended destinations of the objects based on tags included in each of the objects. Destination tags included in the object may include logical process IDs, logical computational IDs, storage node IDs, or physical addresses. The routing nodes include logic to resolve logical tags.

A first processing module generates an object for transfer to another processing module. The first processing module transfers the object to a first routing node. The first routing node receives the object and examines the communication routing data structure to determine the destination of the object based on the tag included in the object. The first routing node determines the destination of the object and routes the object based on the destination. Preferably routing operates to transfer the object to its destination. In other cases, routing operates to transfer the object along its way towards the destination in an appropriate fashion. Additional routing nodes also operate to route the object to its destination.

In one embodiment, one or more of the objects further includes attributes of the data, methods for operating on the data, and a processing list. In another embodiment, the processing list identifies actions to be performed on or with the object by the destination. In still another embodiment, the object may only be modified by a method included in the methods for operating on the data comprised in the object. Items (e.g. entries) in the processing list itself may be used to determine routing such that the object is routed to a processing node capable of performing the function identified in the processing list.

In a further embodiment, when the destination is an intermediate destination, and another one of the plurality of processing modules is a final destination, the method further comprises another of the routing structures, corresponding to the intermediate destination, receiving the object. This routing node examines the communication routing data structure to determine the final destination of the object based on the tag included in the object, and determines the final destination of the object based on the tag included in the object and the communication routing data structure in response to the examining. This routing node then routes the object based on the destination in response to the determining and routes in order to transfer the object to the final destination.

BRIEF DESCRIPTION OF THE DRAWINGS

A better understanding of the present invention can be obtained when the following detailed description of the preferred embodiment is considered in conjunction with the following drawings, in which.

Figure 1:
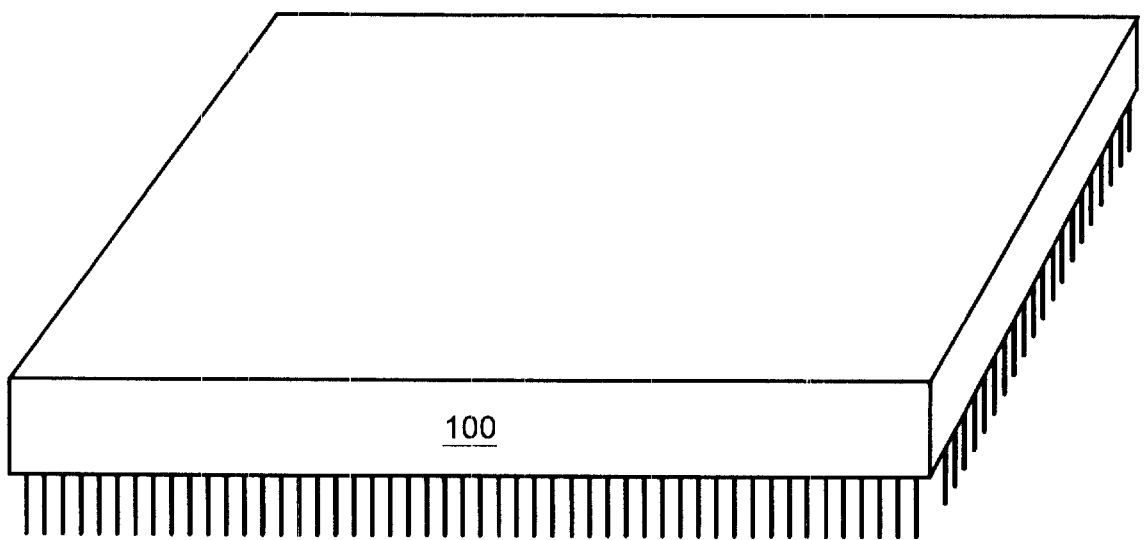
FIG. 1 illustrates a computer chip comprising an on-chip data transfer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises an on-chip data transfer network which routes communication objects with tags, methods and/or processing lists between multiple on-chip modules over routing nodes. A uniform numbering system is adopted for this application. All components referred to with a common number are to be considered equivalent.

FIG. 1

Computer Chip

Referring now to FIG. 1, a computer chip 100 is shown from a top, front view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 preferably uses a generic method for interconnecting multiple module types on a single computer chip 100 using intelligent buffering and a universal port design. Connecting each module to a communications pathway with a full duplex, general-purpose routing node allows heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIG. 2–5 using the uniform numbering system.

FIG. 2A

On-Chip Network with Distributed Switching

Figure 2A:
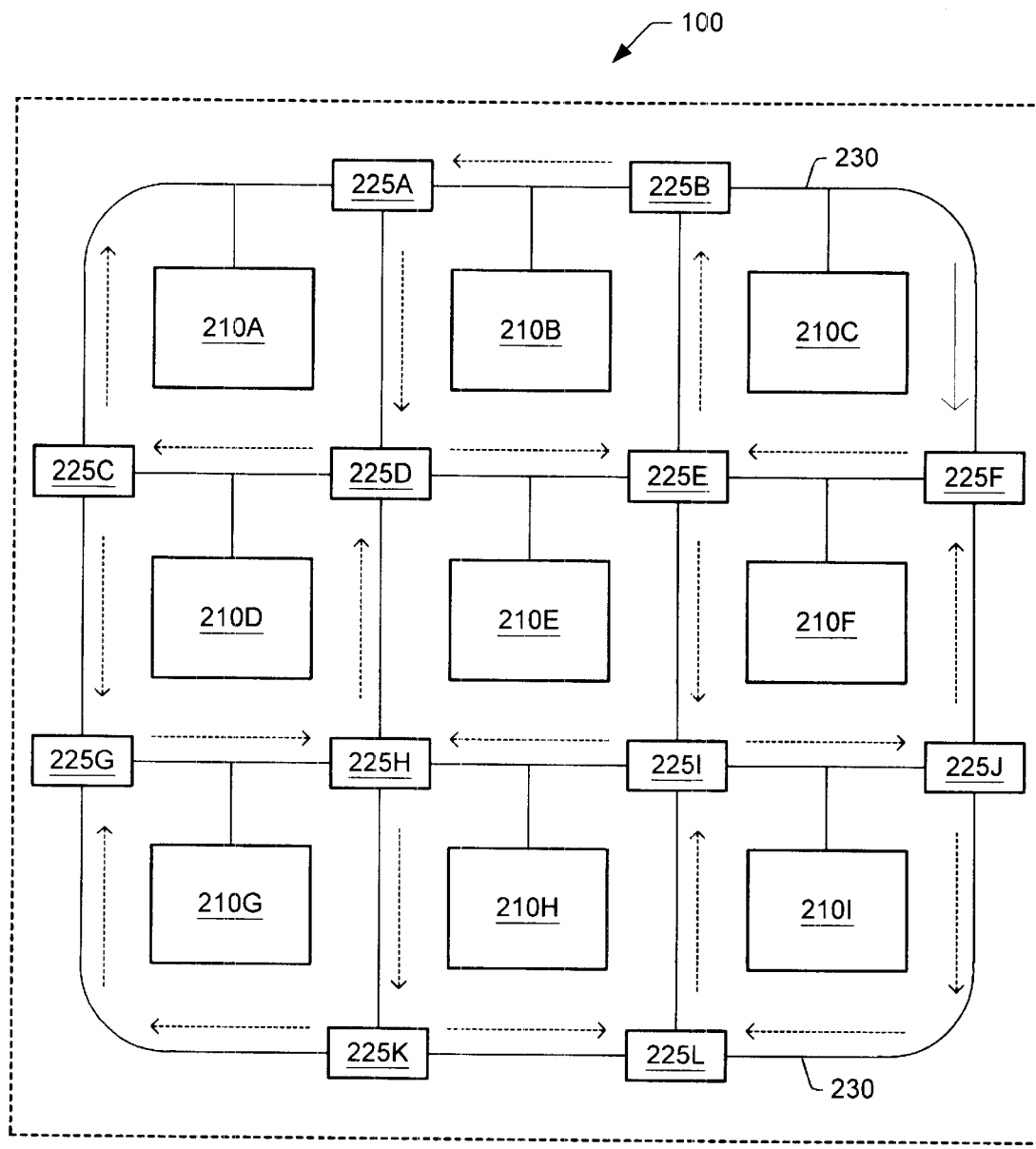
FIGS. 2A, 2B, and 2C illustrate various embodiments of the on-chip data transfer network comprised on the computer chip of FIG. 1.

Referring now to FIG. 2A, an embodiment is shown of computer chip 100 with a data transfer network utilizing a mesh of rings topology for interconnecting a plurality of modules 210A–210I on a single computer chip 100 in an on-chip network. When a reference is made to module 210, that reference may refer to any of the modules 210A–210I. The components of the network preferably include a plurality of buses 230 which provide an electrical path for routing objects between the plurality of modules 210 comprised on the computer chip 100. When a reference is made to bus 230, that reference may refer to any part associated with bus 230, including those labeled with an associated letter designation, such as 230A. For example, bus 230H may preferably refer to the four sections or transfer paths of bus 230 that enclose module 210H, linking routing nodes 225H, 225K, 225L, and 225I. Bus 230 may also be links 230, as desired, providing point-to-point communications.

The modules 210 preferably perform operations, and modules may be devices such as a processor, an I/O controller, or storage (memory), or a hybrid of tasks, like a task-specific hybrid (ASIC) or a task-general hybrid. A plurality of routing nodes 225A–225L, also referred to as bus routing nodes 225, is comprised on computer chip 100 interconnecting the buses 230. Additional details may be found below with respect to FIG. 4.

In the embodiment of FIG. 2A, the system includes, moving from top to bottom, left to right, modules 210A to 210I, in three rows of three modules, each surrounded by buses 230A through 230I. The plurality of buses 230 are collectively configured in a mesh of rings such that a portion of each bus 230 is also a portion of one or more adjacent buses 230. Each bus 230 includes at least three transfer paths, and a subset of buses 230 includes four transfer paths. For example, bus 230A (circulating clockwise) comprises three sections or transfer paths of bus 230 interconnecting routing nodes 225A, 225D, and 225C. Bus 230B (circulating counterclockwise) comprises four sections or transfer paths of bus 230 interconnecting routing nodes 225A, 225D, 225E, and 225B. Thus buses 230A and 230B both include a section or transfer path of bus 230 between routing nodes 225A and 225D where the adjacent counter-circulating flows merge in a common direction on the shared link.

Modules 210A–210I are shown coupled to their respective bus 230 on the topmost segment of the bus 230. Other locations for the module 210 coupling are possible, such as to another segment of bus 230 or to one or more routing nodes operable to route objects to the module 210. In the embodiment of FIG. 2A, the twelve routing nodes 225 are arranged in a two-four-four-two geometry with corner routing nodes 225 not included at the "corners" of the chip 100. One way to define a corner routing node is a routing node that is a part of only one bus 230, e.g., a corner routing node is never shared between two or more buses 230. In an alternative embodiment, corner routing nodes may be included for off-chip communications to extend the mesh of rings over multiple chips. The dotted arrows in FIG. 2A refer to the preferred direction of object movement on bus 230. In general, the preferred direction is clockwise in the upper left-most ring and then alternating counter-clockwise and clockwise for adjacent rings, as shown.

The data transfer network of computer chip 100 preferably includes a plurality of buses 230 comprised on the computer chip 100. Each of the plurality of buses 230 is configured in a ring topology with the plurality of buses 230 configured as a mesh of rings. Each of the plurality of buses 230 includes a portion that is shared with a portion of another of the buses 230. A plurality of bus routing nodes 225 comprised on the computer chip 100 are positioned at intersections of the mesh of rings comprised of the plurality of buses 230. Each of the bus routing nodes 225 is operable to route objects from a source bus 230 to a destination bus 230, which may be the same bus 230. A plurality of modules 210 coupled to at least one of the plurality of buses 230 are operable to communicate with each other through the buses 230 via the routing nodes 225.

In one implementation, each of the plurality of buses 230 is operable to transfer objects in only one direction. The preferred direction is the direction shown in FIG. 2A by the dotted arrows. A subset of the plurality of bus routing nodes 225 may be coupled to receive objects from first or second transfer paths and provide the objects to first, second, third or fourth transfer paths. The preferred direction for data transfer from a module 210 and a bus 230 is to and from the module 210 and the bus 230. In another embodiment, each bus 230 is operable to transfer objects in any direction available.

The plurality of bus routing nodes 225 includes a first plurality of external bus routing nodes 225, such as routing nodes 225A, 225B, 225C, 225F, 225G, 225J, 225K and 225L, and a second one or more internal bus routing nodes, such as routing nodes 225D, 225E, 225H and 225I. In addition, the corner routing nodes referred to above would be external bus routing nodes. The simplest mesh of rings structure data transfer network with both external and internal routing nodes 225 would be a two by two structure with four external routing nodes 225 and one internal routing node 225.

FIG. 2B

Data Transfer Network

Figure 2B:
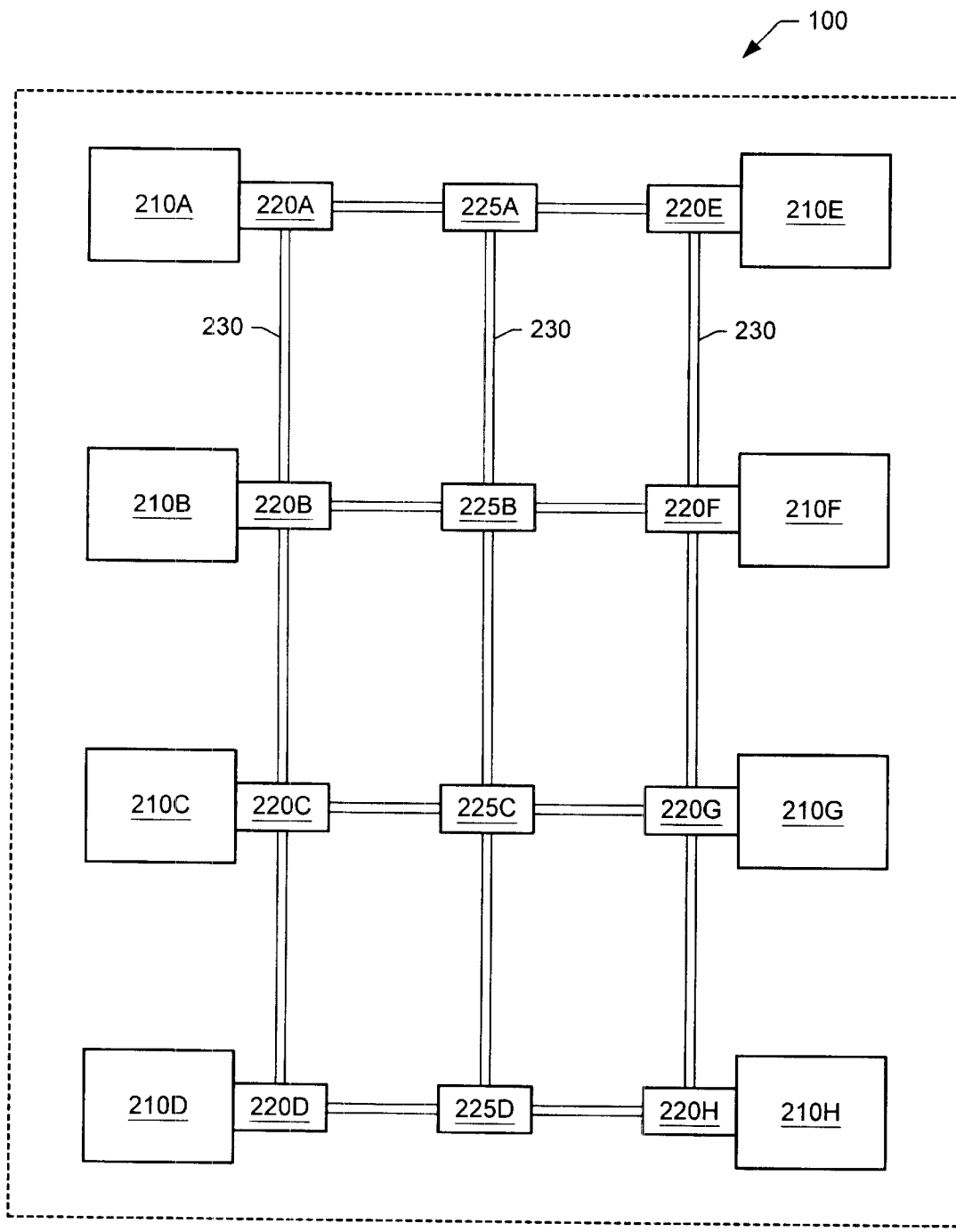

Referring now to FIG. 2B, another embodiment of computer chip 100 with an on-chip data transfer network is shown for interconnecting a plurality of devices or modules 210A–210H linked by a plurality of routing nodes 220A–220H on single computer chip 100. The components of the network preferably include a bus 230 with the plurality routing nodes 220A–220H coupled to the bus 230 as well as a plurality of routing nodes 225A–225D coupled to segments of the bus 230. The bus 230 is comprised of the individual buses 230 connecting between and among ports 220A–220H and/or ports 225A–225D. Routing nodes 225 are preferably a subset of the plurality of routing nodes 220 operable to transmit and receive objects only on the bus 230, as opposed to the other routing nodes 220, which are operable to transmit and receive objects on the bus 230 and with the modules 210.

Each of the plurality of modules 210 is coupled to at least one of the plurality of routing nodes 220. In various embodiments, routing nodes 220 and modules 210 are either directly connected or completely integrated as a single unit. The plurality of modules 210 are configurable to communicate with each other through the routing nodes 220.

Starting on the left side of FIG. 2B, moving top to bottom, modules 210A–210D are respectively coupled to the bus 230 via routing nodes 220–210D. In the center, routing nodes 225A–225D are coupled to segments of the bus 230. On the right side of the figure, modules 210E–210H are coupled to the bus 230 via routing nodes 220E–220H. Routing nodes 220A and 220E are electrically coupled to routing node 225A by bus 230. Likewise, routing node pairs 220B and 220F are electrically coupled to routing node 225B, routing node pairs 220C and 220O are electrically coupled to routing node 225C, and routing node pairs 220D and 220H are electrically coupled to routing node 225D by segments of bus 230.

Although FIG. 2B shows eight routing nodes 220 electrically coupled for information transmission on a bus 230 along with four routing nodes 225, one skilled in the art could add or subtract from these numbers as desired. Additionally, FIG. 2B shows each module 210 coupled to the bus 230 by only one routing node 220, one skilled in the art might also choose to connect a particular module 210 to more than one place on bus 230 through one or more additional routing nodes 220 or 225. For each coupling of objects or means, the coupling could be electrical, optical, or mechanical as desired.

The plurality of routing nodes 220 and/or 225 are operable to dynamically select different ones of the buses 230 to dynamically form one or more separate communication paths. These communication paths may cross each other, and some routing nodes 220 and/or 225 may be included in more than one communication path concurrently. The grid-like shape shown in FIGS. 2A and 2B, for example, may be expanded to form any geometry or hyper-geometric representation. As an example, more columns of routing nodes 225 coupled via buses 230 may be added to provide additional nexus points for the re-configurable communication paths. Each routing node 220 and/or 225 preferably includes configuration logic 360 which either controls the re-configurable communication paths and/or the routing of communications by accepting configuration input from the modules 210 or other, possibly off chip, masters. In one embodiment, the configuration logic 360 is adaptive and "learns" based upon previous routing decisions and results. The bus 230 may include addressing and/or control lines (not shown). In the embodiment of FIG. 2B, the bus 230 is preferably a network of transfer links. Additional details concerning FIG. 2B are disclosed elsewhere under the uniform numbering system.

FIG. 2C

On-Chip Network with Dual Buses

Figure 2C:
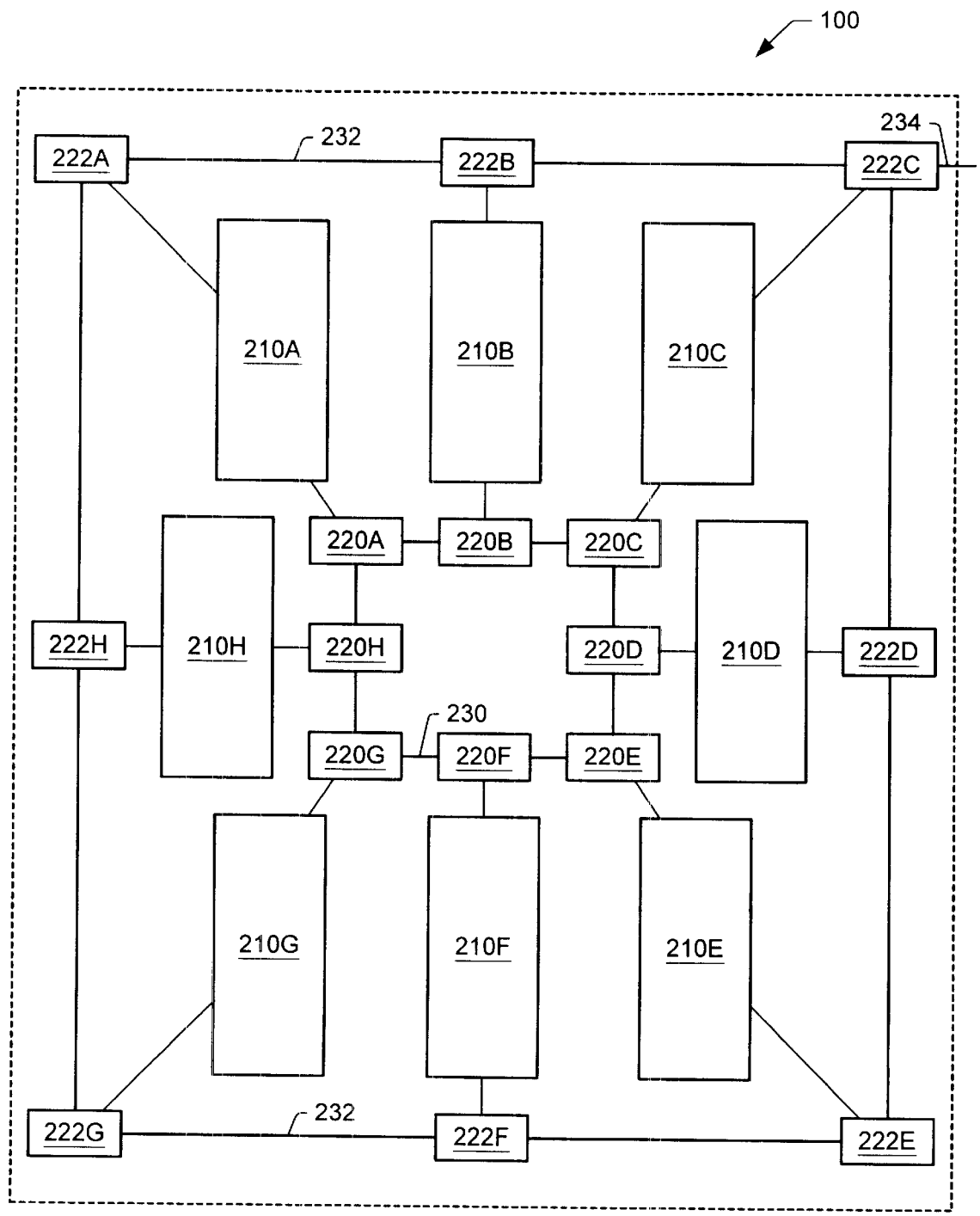

Referring now to FIG. 2C, an embodiment is shown of computer chip 100 with a data transfer network utilizing a multiple circular topology for interconnecting a plurality of modules 210A–210H on a computer chip 100 in an on-chip network. The components of the network preferably include a plurality of buses, such as buses 230 and 232, which provide an electrical path for data communications between the plurality of modules 210 comprised on the computer chip 100. It is noted that although the embodiment of FIG. 2C includes two buses 230 and 232, a greater number of buses may be included, as desired. When a reference is made to bus 230 or 232, that reference may refer to any part associated with bus 230 or 232, including any sections labeled with an associated letter designation, such as 230A.

The modules 210 preferably perform operations, and modules may be devices such as a processor, an I/O controller, or storage (memory), or a hybrid of tasks, like a task-specific hybrid (ASIC) or a task-general hybrid. Additional details concerning the modules 210 may be found below in reference to FIG. 4. A plurality of routing nodes 220A–210H and 222A–222H is also comprised on the computer chip 100. Each of the plurality of routing nodes 220 and 222 is coupled to one or more of the buses 230 or 232. Each of the routing nodes 220 and 222 is operable to route objects from a source bus 230 or 232, or section thereof, to a destination bus 230 or 232, or section thereof.

In the embodiment of FIG. 2C, computer chip 100 includes, moving in a clockwise fashion from upper left, from the outside in, routing nodes 222A–222H coupled to bus 232 in a circular topology. Each routing node 222A–222H is further coupled to an associated module 210–210H. Each module 210–210H is further coupled to an associated routing node 220A–210H, which is collectively coupled to bus 230 in a circular topology. Other couplings for the modules 210 are possible, such as to another module 210 or to additional routing nodes 220 or 222. Routing node 222C is shown with an additional connection 225 of bus 232, which may couple computer chip 100 to another computer chip.

Each of the buses 230 or 232 may be unidirectional, that is, only transmitting objects in one direction. For unidirectional buses 230 or 232, each bus 230 or 232 preferably transmits objects in a direction opposite to its nearest neighbor bus 230 or 232. For example, when a first bus 230 or 232 is operable to transfer objects in a first direction, a second bus 230 or 232 is operable to transfer objects in a second opposite direction. One or more of the buses 230 or 232 may transfer objects in two directions. Any bus 230 or 232 may also include addressing and control lines in addition to data lines. Other special function lines may also be included in buses 230 or 232 as desired.

The routing nodes 220 or 222 may be physically separate or incorporated into the modules 210. An incorporated routing node 220 or 222 in a module 210 would perform in a similar fashion to transmit and receive objects on one or more of the buses 230 or 232. One or more of the routing nodes 220 or 22 may be further operable to transfer objects from one of the buses 230 or 232 to a bus connection, such as routing node 220 or 222 operable to route objects to a device off of the computer chip 100. Special notice is taken of additional connection 234 of bus 232 of FIG. 2C as an example of an off-chip extension of the connections. Additional details of routing nodes 220/222 may be found below in reference to FIGS. 3A, 3B, and 3C.

In another embodiment, the data transfer network of computer chip 100, preferably includes a plurality of routing nodes 220/222 comprised on the computer chip 100 as well as a plurality of transfer paths 230/232 comprised on the computer chip 100 along with a plurality of modules 210. Each of the plurality of transfer paths 230/232 is directly connected between two of the routing nodes 220/222 with a first group of the plurality of transfer paths 230 and a first group of the plurality of routing nodes 220 collectively forming a first traffic circle and with a second group of the plurality of transfer paths 232 and a second group of the plurality of routing nodes 222 collectively forming a second traffic circle different from the first traffic circle. Each of the plurality of routing nodes 220/222 is coupled to at least two transfer paths 230/232. Each of the plurality of routing nodes 220/222 is operable to route objects from a source transfer path 230/232 to a destination transfer path 230/232. Each of the plurality of modules 210 is coupled to at least one of the plurality of routing nodes 220/222, and the plurality of modules 210 are operable to communicate with each other through the transfer paths 230/232.

In this embodiment, at least a subset of the plurality of modules 210 are coupled to one or more routing nodes 220 in the first group of the plurality of routing nodes 220 in the first traffic circle. This subset of modules 210 are further coupled to one or more routing nodes 222 in the second group of the plurality of routing nodes 222 in the second traffic circle. A further subset of the plurality of modules 210 is operable to communicate through the first traffic circle and the second traffic circle.

In one implementation, each of the groups of transfer paths 230/232 is operable to transfer objects in only one direction. The preferred direction is the direction opposite to the direction of the other group of transfer paths 230/232. In another implementation, each bus or transfer path 230/232 is operable to transfer objects in any direction available.

Another embodiment of computer chip 100 includes a first bus 230 comprised on the computer chip 100, a second bus 232 comprised on the computer chip 100, a plurality of routing nodes 220 and 222 comprised on the computer chip 100, and a plurality of modules 210. Each of the first and second buses 230 and 232 is configured in a circular topology, and each of the first and second buses 230 and 232 is operable to transfer objects in a circular fashion. The plurality of routing nodes 220 and 222 comprised on the computer chip 100 are coupled to one or more of the first circular data bus 230 and the second circular data bus 232 and are operable to route objects from a source to a destination. Each of the plurality of modules 210 is coupled to at least one of the plurality of routing nodes 220 or 222 and is operable to communicate with each other through one or more of the buses 230 and 232.

FIG. 3A

Routing Node

Figure 3A:
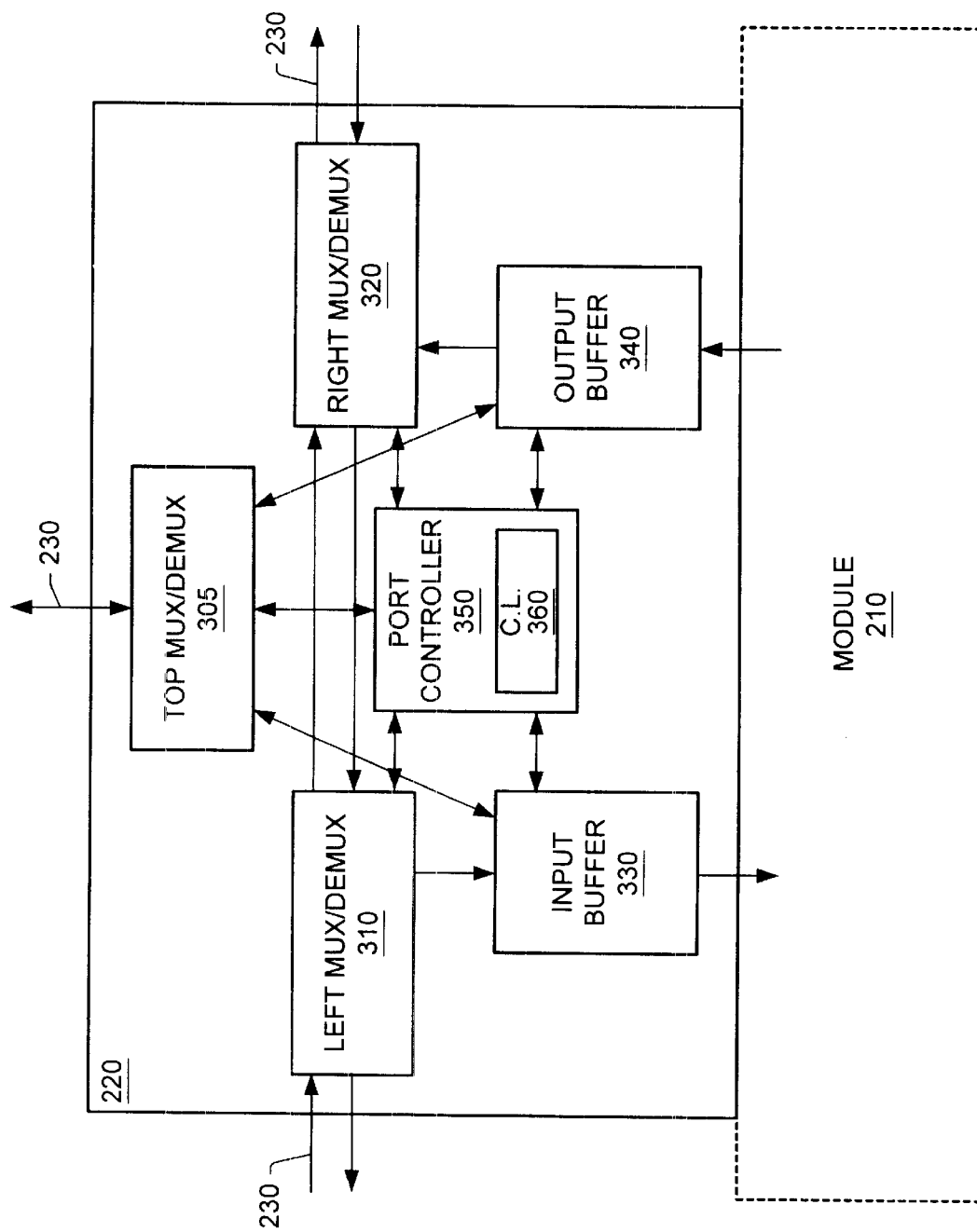
FIGS. 3A, 3B, and 3C illustrate various embodiments of routing nodes that is a part of the on-chip data transfer networks shown in FIGS. 2A, 2B, and 2C.

Referring now to FIG. 3A, an embodiment of routing node 220/222 is shown along with the couplings between routing node 220/222 and bus 230/232. Although routing node 220 is shown as a separate item from module 210, in another embodiment routing node 220 may be incorporated into module 210. Preferably included as components of routing node 220 are top multiplexer(MUX)/demultiplexer (DEMUX) 305 coupled to one segment of the buses 230 and/or 232, a pair of MUX/DEMUXs, left MUX/DEMUX 310 and right MUX/DEMUX 320, each coupled to other segments of bus 230, input buffer 330, output buffer 340 and port controller 350. Left MUX/DEMUX 310 and right MUX/DEMUX 320 are coupled together. Left MUX/ DEMUTX 310 is further coupled to input buffer 330, which is further coupled to module 210. Right MUX/DEMUX 320 is further coupled to output buffer 340 which is also coupled to module 210.

Operations of routing node 220 are preferably controlled by the port controller 350 which preferably includes bus interface logic associated with the configuration logic 360 for selectively routing objects between and/or among the various buses, including the bus 230 and the backbone bus 205. All included components of port controller 350 may also be comprised in module 210 or a separate part of computer chip 100. In a preferred embodiment, port controller 350, including bus interface logic and configuration logic 360, is coupled to various segments of the bus 230. The port controller 350 is configured to issue communications and/or commands to top MUX/DEMUX 305, left MUX/ DEMUX 310, right MUX/DEMUX 320, input buffer 330 and output buffer 340. In addition, top MUX/DEMUX 305 is coupled to input buffer 330 and output buffer 340. Controller 350 is preferably configured to control transfer of objects to and from one segment of bus 230 and module 210 by way of top MUX/DEMUX 305 via input buffer 330 and output buffer 340. Port control 350 is also preferably configured to control information transfer between other segments of bus 230 and module 210 by regulating transfer of objects from module 210 to output buffer 340 through the right MUX/DEMUX 320 and onto bus 230. In this embodiment, port controller 350 controls transfer of objects from the various segments of the bus 230 to other various segments of the bus 230 through transfer of objects from top MUX/DEMUX 305 to output buffer 340 through right MUX/DEMUX 320 and then onto bus 230. Optionally, right MUX/DEMUX 320 can route objects through left MUX/ DEMUX 310 before the objects are transferred to bus 230. The reverse data transfers are also contemplated.

Input buffer 330 and output buffer 340 may also be comprised as part of module 210. Top MUX/DEMUX 305, left MUX/DEMUX 310, and right MUX/DEMUX 320, input buffer 330 and output buffer 340 may interchangeably be data transfer buffers and/or multiplexers and/or demultiplexers. Each routing node 220 preferably includes one or more data transfer buffers. At least a first portion of the one or more data transfer buffers is coupled to the bus interface logic that is a part of port controller 350. The first portion of the one or more data transfer buffers is configurable to communicate information between the module 210 and the various segments of the bus 230. A second portion of the one or more data transfer buffers is coupled to the bus interface logic preferably included in port controller 350. The second portion of the one or more data transfer buffers is configurable to communicate information among the various segments of the bus 230.

In another embodiment, computer chip 100 includes an additional plurality of buffers with each of the additional buffers coupled between their respective routing node 220 and the bus 230. This plurality of buffers is operable for buffering objects between a respective routing node 220 and the bus 230. It is noted that in various embodiments the routing node 220 may include routing tables and/or communication processing capabilities such that information is routed to the correct segment of the bus 230 based on information in an object's tag fields and/or processing list. Additional details concerning FIG. 3A are disclosed elsewhere under the uniform numbering system.

Figure 3B:
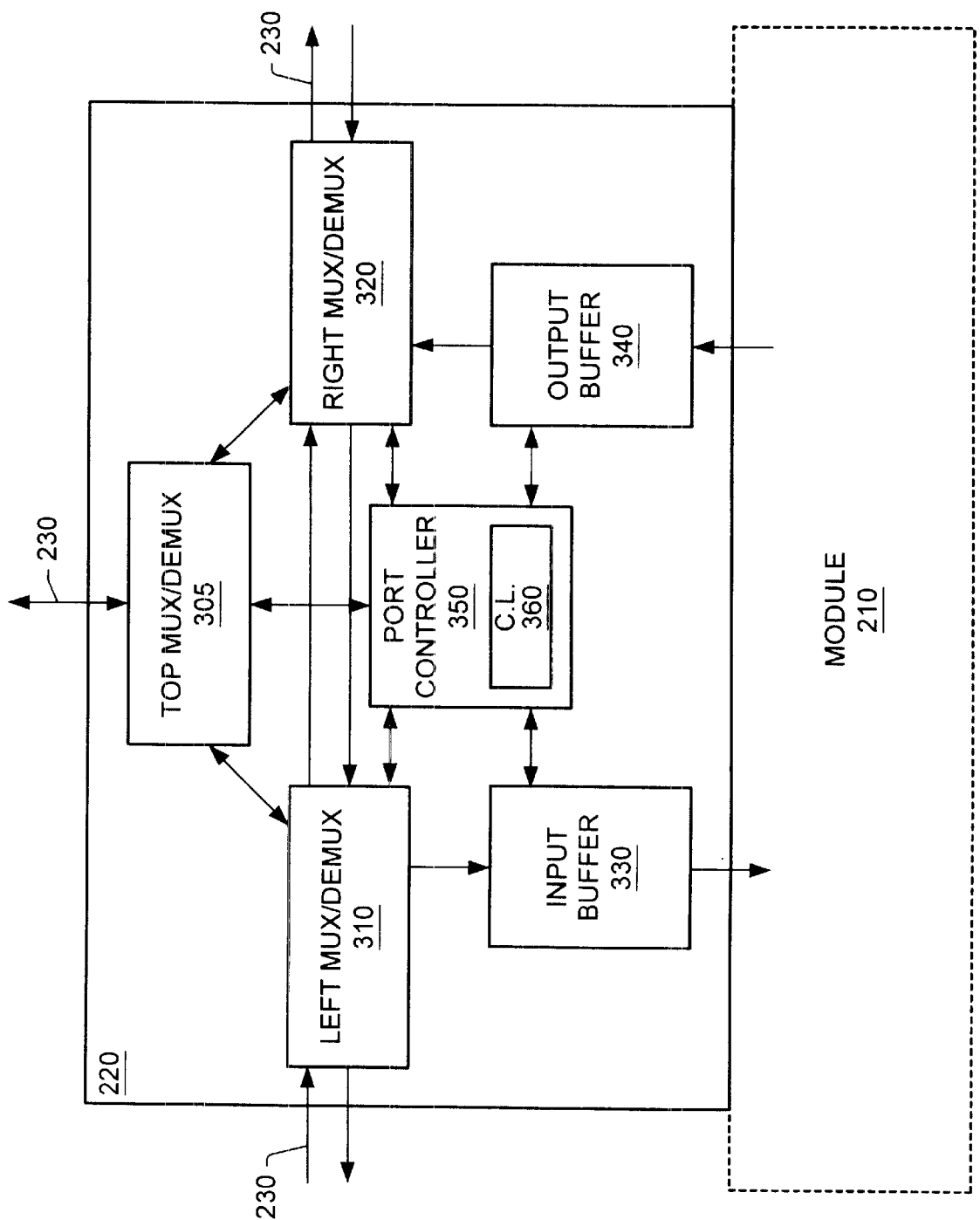

FIG. 3B
Another Routing Node
Referring now to FIG. 3B, an embodiment is shown of routing node 220/222 wherein data transfers among the bus 230/232 and the module 210 are made from top MUX/ DEMUX 305 directly to and from left MUX/DEMUX 310 and/or right MUX/DEMUX 320. In this embodiment top MUX/DEMUX 305 is not connecting to input buffer 330 or output buffer 340. Otherwise the components, operations and designations in FIG. 3B are the same as FIG. 3A. Additional details concerning FIG. 3B are disclosed elsewhere under the uniform numbering system.

Figure 3C:
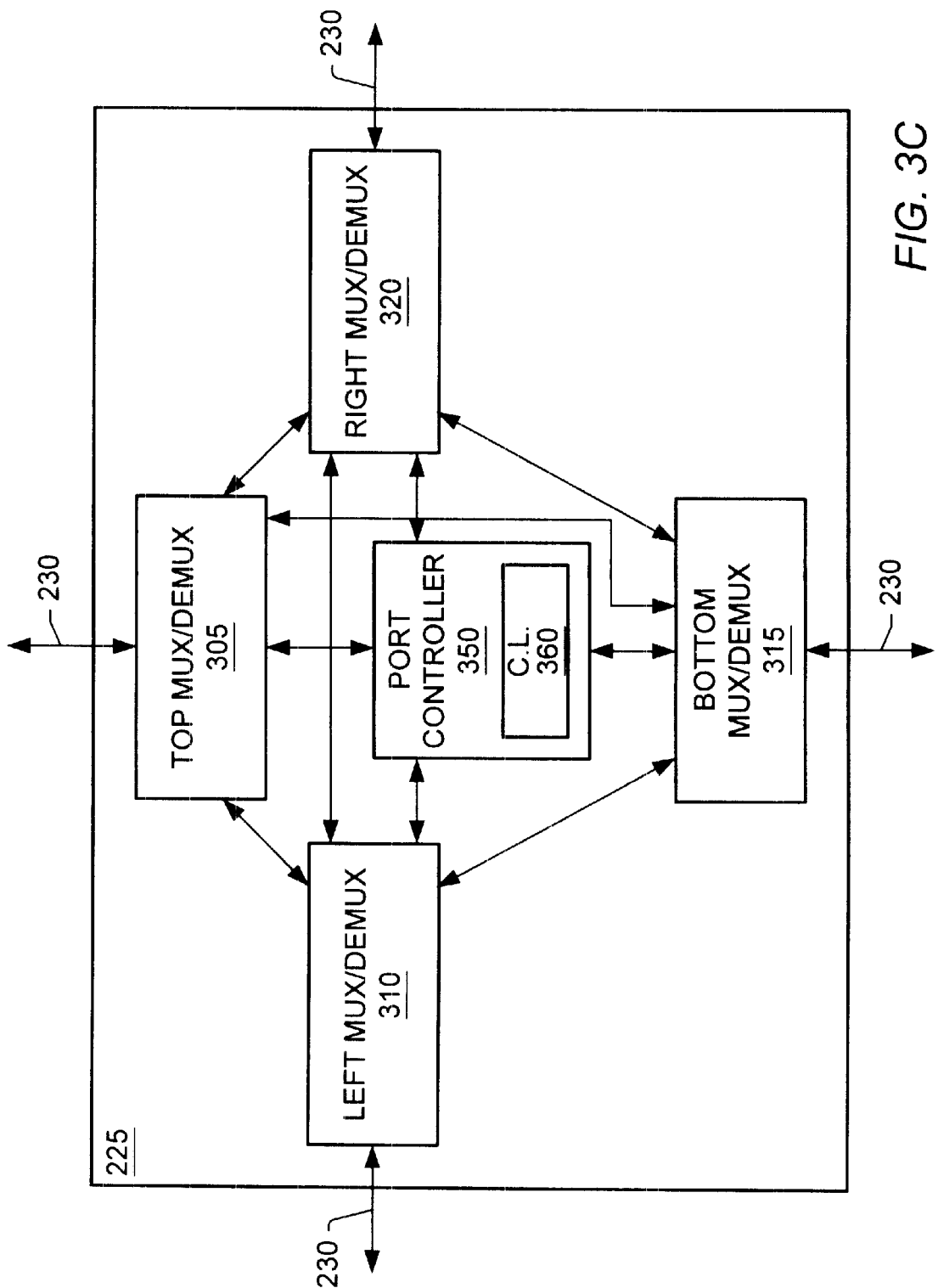

FIG. 3C
Four Way Routing Node
Referring now to FIG. 3C, an embodiment is shown of routing node 225 for data transfers among the various segments of the bus 230/232. The illustrated embodiment is similar in design to the embodiment of routing node 220/222 shown in FIG. 3B with the input buffer 330 and the output buffer 340 replaced by a bottom MUX/DEMUX 315 coupled to the top MUX/DEMUX 305, left MUX/DEMUX 310 and right MUX/DEMUX 320. Control of the bottom MUX/DEMUX 315 is preferably by the port controller 350 as shown.

Routing node 225 is shown with all four units 305, 310, 315, and 320 coupled to four segments of the bus 230. Alternatively, top MUX/DEMUX 305 and/or bottom MUX/ DEMUX 315 is coupled to a module 210. Configured coupled to one or more of the modules 210, routing node 225 becomes an embodiment of routing node 220/222. Otherwise the components, operations and designations in FIG. 3C are the same as FIGS. 3A and 3B. Additional details concerning FIG. 3C are disclosed elsewhere under the uniform numbering system.

Figure 4:
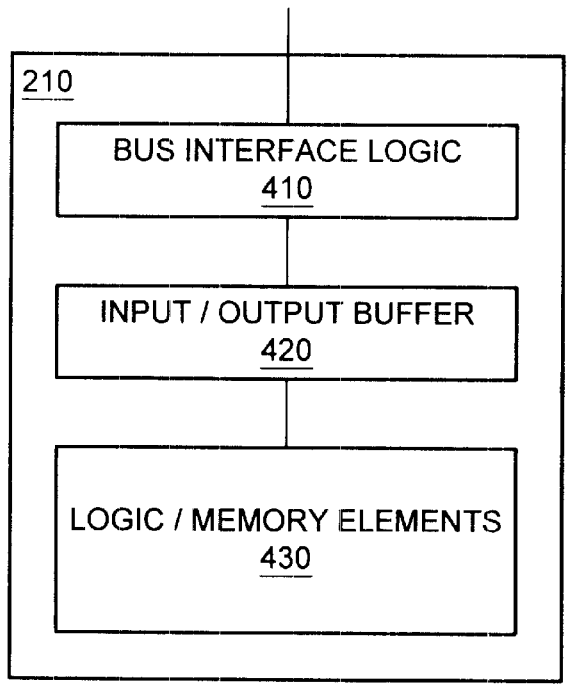
FIG. 4 illustrates an embodiment of a module that is a part of the on-chip data transfer networks shown in FIGS. 2A, 2B, and 2C.

FIG. 4
Module
Referring now to FIG. 4, a module 210 is shown. Each module 210 is preferably one of the group that includes processors, memories, and hybrids. A processor may be a CPU, FPU, DSP, or an I/O controller in any of the variety of possible forms. A memory may be a RAM, ROM, hybrid memory, or active memory in any of the variety of possible forms. Hybrids combining processing and memory storage capabilities may be task-specific, like an ASIC, or task-general.

Each module may couple to a bus 230/232, a routing node 220/222 or other device as desired using bus interface logic 410 either incorporated in the module 210 or as part of a routing node 220/222 physically imposed between the module 210 and the bus 230/232, etc. A routing node 220/222 is operable to transmit and receive objects on the transfer paths or buses 230/232, etc., either when comprised in the module 210 or independently.

Module 210 preferably transmits and receives objects from other modules 210 via an input/output buffer 420 coupled to the bus interface logic 410 and the logic/memory elements 430 of the module 210. Other components with or without other couplings may also comprise the module 210 as desired.

Figure 5A:
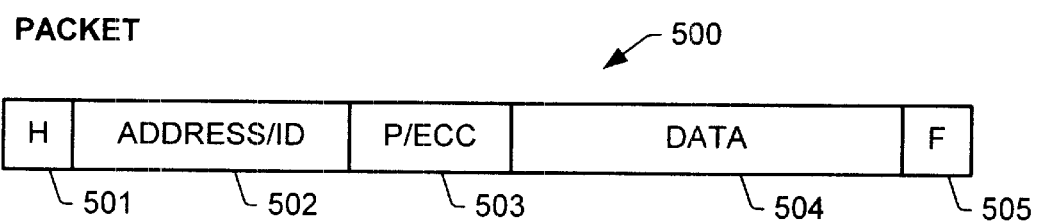
FIGS. 5A–5B illustrate embodiments of communications objects transferred over the on-chip data transfer networks shown in FIGS. 2A, 2B, and 2C.
Figure 5B:
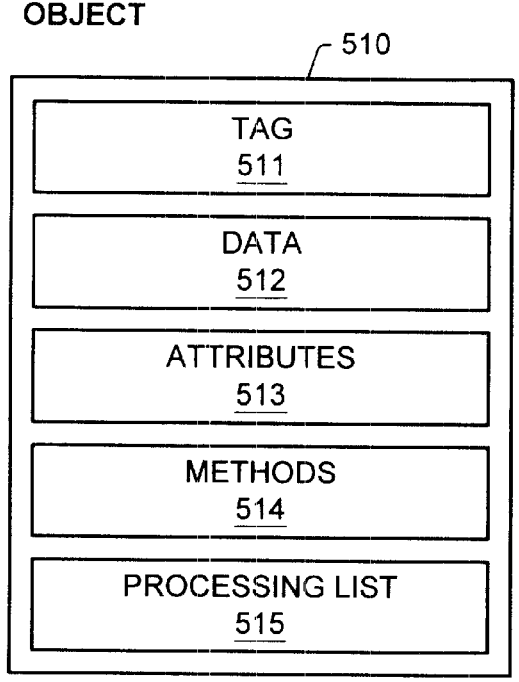
Figure 5B:
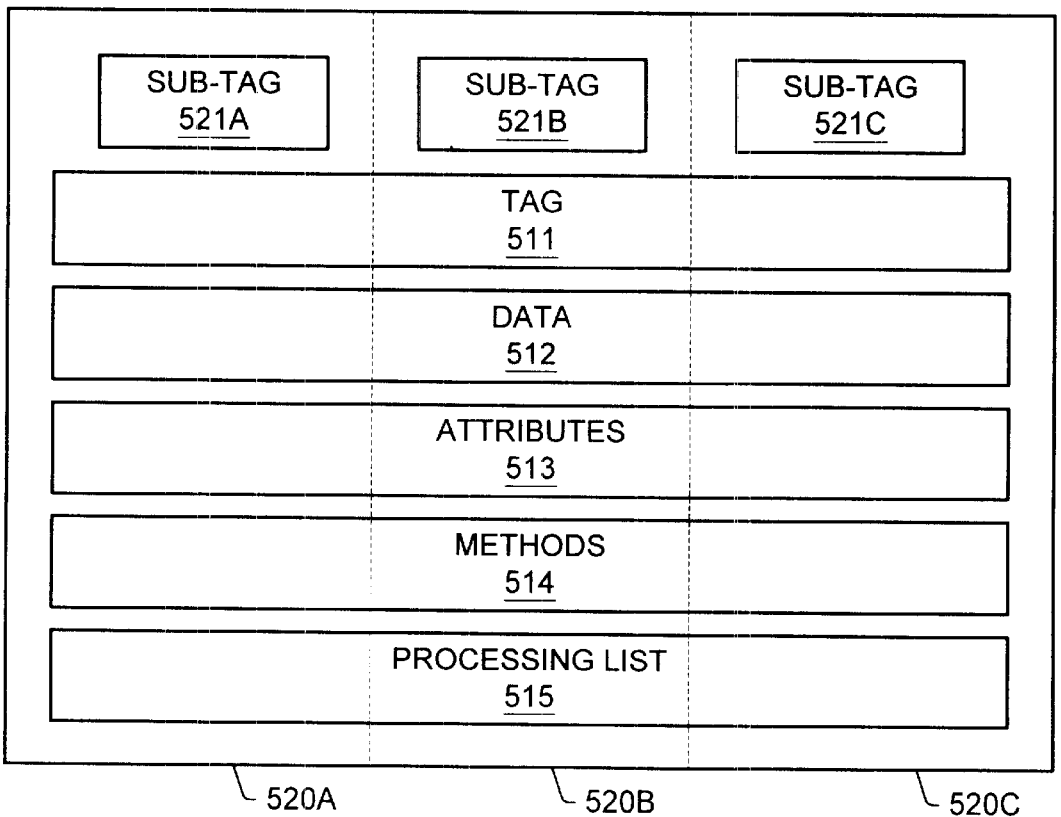

FIGS. 5A & 5B
Communication Packets and Objects
A communication packet 500 is illustrated in FIG. 5A. A header 501 and a footer 505 frame the start and end of the packet 500, respectively. The header 501 is followed by a destination address 502 in a suitable format. Alternatively, instead of an address 502, the ID of the object may be used to determine the destination of the object. Following the address 502 are optional priority or error correction codes 503 and the data 504 being transmitted. In various embodiments, the packet 500 comprises only a portion of the communication being transmitted, so that a plurality of packets 500 must to recombined by the destination. The header 501 preferably includes sequence information for reconstructing the communication from the plurality of packets 500.

In one embodiment, the destination address 502 may be an intermediate destination address. The routing node is responsible for looking at tag information and updating the destination address 502 either to the next routing node in the object's routing path or to the final destination.

An object 510 is illustrated in FIG. 5B. Each object 510 preferably includes a tag 511, data 512, one or more attributes 513, methods 514, and a processing list 515. The tag 511 may include an encoded destination for the object. The tag 511 is preferably referenced by the routing nodes 220/222/225 and compared to a look-up table stored in the routing node 220/222/225 to enable the routing node 220/222/225 to route the object 510 to its destination. The tag 511 may also include a time stamp with the creation time and/or date or the time and/or date when the object was last modified. The tag 511 may also include The tag 511 may also include a priority value, an ownership value, a creator value, or access-allowed value, identifying the object's priority, current owner, creator, or the modules 210 allowed to access or modify the object 510, respectively. Additional tag values are contemplated, such as previously-modified-by values or last-modified-by values.

Also showed in FIG. 5B is an example of an object 510 that is subdivided in into sub-objects 520/521/522. Each sub-object 520/521/522 further includes a sub tag 521A/521B/521C, respectively. It is noted that other divisions of object 510, other than the one shown, are contemplated.

In a preferred embodiment, a communication routing data structure is communicated to one or more of the plurality of routing nodes 220/222/225. The communication routing data structure includes information regarding one or more objects 510 comprised in the communication system. The communication routing data structure further includes the intended destinations of the objects 510 based on tags included in each of the objects. In one implementation, the communication routing data structure is accumulated from objects sent to the plurality of routing nodes 220/222/225. In another implementation, one or more of the modules 210 maintain the communication routing data structure and communication the communication routing data structure to one or more of the plurality of routing nodes 220/222/225. The communication routing data structure may be comprised in an object ID or in a processing list.

A first processing module 210X generates an object 510 for transfer to another processing module 210Y. The first processing module 210X transfers the object 510 to a first routing node 220/222/225X. The first routing node 220/222/225X receives the object 510 and examines the communication routing data structure, the object ID, or the processing list to determine the destination of the object 510 based on the tag 511 included in the object 510. The first routing node 220/222/225X determines the next destination of the object 510 and routes the object 510 based on the destination. Preferably routing operates to transfer the object 510 to its destination. In other cases, routing operates to transfer the object 510 along its way towards the destination in an appropriate fashion. Routing over a network to a destination is well known in the art and will not be further detailed herein. Additional routing nodes 220/222/225/Y/Z also operate to route the object 510 to its destination. When an object 510 is divided into sub-objects, 520 with sub-tags 521, upon receipt of the sub-objects 520, the destination uses the sub-tags 521 to reintegrate the sub-objects 520 into the object 510.

It is noted that in one embodiment, the processing list identifies methods that would imply or be best carried out by a specific processor or processor type. For example, an FFT could be sent to a generic DSP or to a specific DSP, or to a scalar processor as a secondary alternative if a DSP is unavailable or busy. Thus, routing is determined such that the object is routed to the appropriate processor or processor type.

In another embodiment, an object includes logical process IDs, logical computational IDs, logical storage IDs, or physical addresses. The routing nodes include logic that decodes and resolves the logical tags to routing the object to the appropriate processor, storage device, or physical address. As noted above, the routing nodes may also route the object to another routing node closer to the intended destination, thus allowing the routing nodes to be programmed with the direction of the destination instead of the exact location.

Conclusion

Although the system of the present invention has been described in connection with the preferred and various embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for routing objects in a communication system, wherein the communication system comprises a plurality of routing nodes and a plurality of interconnecting processing modules coupled to the routing nodes, wherein each of the objects includes a tag that identifies the object, and data; the method comprising:

providing a communication routing data structure to one or more of the plurality of routing nodes, wherein the communication routing data structure includes information regarding one or more objects comprised in the communication system and destinations of said one or more objects based on said tags included in said objects;

a first processing module generating an object for transfer to another one of said plurality of processing modules;

one or more of said routing nodes receiving said object;

said one or more of said routing nodes examining said communication routing data structure to determine a destination of said object based on said tag included in said object;

said one or more of said routing nodes determining said destination of said object based on said tag included in said object and said communication routing data structure in response to said examining; and said one or more of said routing nodes routing said object based on said destination in response to said determining, wherein said routing operates to transfer said objects to said destination;

wherein one or more of said objects further includes attributes of said data, methods for operating on said data, and a processing list;

wherein said processing list may be used by said one or more of said routing nodes to determine a next destination of said one or more of said objects; and wherein said processing list identifies said methods to be performed on or with said object by said destination.

2. The method of claim 1, wherein said communications system is comprised on a computer chip.

3. The method of claim 1, wherein said object may only be modified by a method included in said methods for operating on said data comprised in said object.

4. The method of claim 1, wherein said destination is an intermediate destination, and said another one of said plurality of processing modules is a final destination, the method further comprising:

another of said one or more of said routing structures receiving said object, wherein said another of said one or more of said routing structures corresponds to said intermediate destination;

said another one or more of said routing nodes examining said communication routing data structure to determine said final destination of said object based on said tag included in said object;

said another one or more of said routing nodes determining said final destination of said object based on said tag included in said object and said communication routing data structure in response to said another one or more of said routing nodes examining; and said another one or more of said routing nodes routing said object based on said destination in response to said another one or more of said routing nodes determining, wherein said another one or more of said routing nodes routing operates to transfer said objects to said final destination.

5. The method of claim 1, further comprising:

said first processing module subdividing said object into a plurality of sub-objects prior to said one or more of said routing structures receiving said object, wherein each of said sub-objects includes a sub-tag, wherein said sub-tab is an assembly sub-tag for reassembling said plurality of sub-objects into said object; and said destination reassembling said plurality of sub-objects into said object using said sub-tab from said each of said sub-objects;

wherein said sub-objects are otherwise treated as objects in said communications system.

6. The method of claim 1, wherein said tags include one or more of the group consisting of: a creation time stamp, a last modified time stamp, a priority value, a creator ownership value, an access allowed valued, a previously modified-by value, a last modified-by value, an assembly tag, and a processing list.

7. A method for operating on data in a system, wherein the system comprises a plurality of processing modules and one or more routing nodes, wherein each of the plurality of processing modules are operable to operate on objects including a data portion, a method portion including one or more methods which are executable to perform operations on the data, and a processing list which lists one or more of said methods which are to be executed on said data; the method comprising:

generating a first object;

routing said first object through one or more of said communication nodes to a destination processing node;

the destination processing module receiving said object;

the destination processing module examining said processing list to determine which of said methods are to be executed; and the destination processing module executing one or more of said methods according to said processing list to perform operations on said data in response thereto.

8. The method of claim 7, wherein each of said objects further includes a tag, wherein said tags identify said objects to said plurality of processing modules and said one or more routing nodes, the method further comprising:

said plurality of processing modules and said one or more routing nodes exchanging a communication routing data structure, wherein said communication routing data structure includes information regarding one or more objects comprised in said system and destinations of said one or more objects based on said tags included in said each of said objects.

9. The method of claim 8, wherein said first object maintains its existing tag after being operated on by said destination processing module, unless said operations change said first object into a second object, wherein said second object includes a different tag that is different from said tag of said first object.

10. The method of claim 7, wherein said communications system is comprised on a computer chip.

11. The method of claim 7, wherein said object may only be modified by a method included in said one or more methods included in said object.

12. A system for operating on data in a communication system, the system comprising:

a communication network for routing objects that include data and a tag;

a plurality of processing modules for processing said data included in said objects, wherein each of the processing modules includes a respective processing memory for storing said objects, wherein said plurality of processing modules are linked through said communication network;

a plurality of routing nodes which are operable to route said objects between different ones of the plurality of processing modules through said communication network, wherein each of the routing nodes includes a respective routing memory for storing memory objects, wherein each of the routing nodes are operable to route said objects throughout the system, wherein said objects include stored objects stored in various ones of the respective processing memories and the respective routing memories;

a plurality of said stored objects, wherein each of said plurality of said stored objects further includes one or more methods that are executable to perform operations on the data, and a processing list that lists one or more of said one or more methods to be executed on said data;

wherein each of the plurality of processing nodes are operable to execute one or more of said objects to examine said processing list and execute one or more methods identified by said processing list to perform corresponding operations on the data.

13. The system of claim 12, wherein said communications system is comprised on a computer chip.

14. The system of claim 12, wherein each of said objects may only be modified by a method included in said methods that are executable to perform operations on the data comprised in said each of said stored objects.

15. The system of claim 12, wherein said tags include one or more of the group consisting of: a creation time stamp, a last modified time stamp, a priority value, a creator ownership value, an access allowed valued, a previously modified-by value, a last modified-by value, and an assembly tag.

* * * * *